United States Patent
Baba

(10) Patent No.: US 11,942,604 B2
(45) Date of Patent: Mar. 26, 2024

(54) SOLID-STATE BATTERY AND METHOD FOR MANUFACTURING THE SAME

(71) Applicant: Murata Manufacturing Co., Ltd., Nagaokakyo (JP)

(72) Inventor: Akira Baba, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 379 days.

(21) Appl. No.: 16/898,474

(22) Filed: Jun. 11, 2020

(65) Prior Publication Data

US 2020/0303780 A1  Sep. 24, 2020

Related U.S. Application Data

(63) Continuation of application No. PCT/JP2019/006941, filed on Feb. 25, 2019.

(30) Foreign Application Priority Data

Mar. 2, 2018  (JP) .................................. 2018-037225

(51) Int. Cl.
*H01M 10/0585* (2010.01)
*H01M 10/0562* (2010.01)
*H01M 50/54* (2021.01)

(52) U.S. Cl.
CPC ... *H01M 10/0585* (2013.01); *H01M 10/0562* (2013.01); *H01M 50/54* (2021.01)

(58) Field of Classification Search
CPC ............. H01M 10/0585; H01M 50/54; H01M 10/0562
See application file for complete search history.

(56) References Cited

U.S. PATENT DOCUMENTS 8,753,770 B2 *  6/2014  Kawamoto ........... H01M 4/667
429/94
2019/0348644 A1  11/2019  Minamitani

FOREIGN PATENT DOCUMENTS

| CN | 102844930 B | * | 5/2016 | ........ H01M 10/0525 |
| JP | 2007080812 A | | 3/2007 | |
| JP | 2011082097 A | | 4/2011 | |
| JP | 2015220105 A | * | 12/2015 | |
| JP | 2015220105 A | | 12/2015 | |
| JP | 2016143520 A | * | 8/2016 | |

(Continued)

OTHER PUBLICATIONS

English machine translation of JP2016143520A (Year: 2016).*

(Continued)

*Primary Examiner* — Kourtney R S Carlson
(74) *Attorney, Agent, or Firm* — ArentFox Schiff LLP

(57) ABSTRACT

A solid-state battery having a battery body that includes a plurality of adjacent elements. A first external electrode is electrically connected to a first positive electrode. A second external electrode is electrically connected to a first negative electrode. A third external electrode is electrically connected to a second positive electrode. A fourth external electrode is electrically connected to a second negative electrode. A first element and a second element of the plurality of adjacent elements are connected in series by integrating the first external electrode and the fourth external electrode or by integrating the second external electrode and the third external electrode.

7 Claims, 8 Drawing Sheets

(56) References Cited

FOREIGN PATENT DOCUMENTS

| JP | 2016143520 A | 8/2016 |
|---|---|---|
| WO | 2018092640 A1 | 5/2018 |

OTHER PUBLICATIONS

International Search Report issued for PCT/JP2019/006941, dated May 28, 2019.
Written Opinion of the International Searching Authority issued for PCT/JP2019/006941, dated May 28, 2019.
Japanese Office Action issued for Japanese Patent Application No. 2020-503480, Japanese Office Action dated Feb. 22, 2022.

* cited by examiner

//SOLID-STATE BATTERY AND METHOD FOR MANUFACTURING THE SAME

CROSS REFERENCE TO RELATED APPLICATIONS

The present application is a continuation of International application No. PCT/JP2019/006941, filed Feb. 25, 2019, which claims priority to Japanese Patent Application No. 2018-037225, filed Mar. 2, 2018, the entire contents of each of which are incorporated herein by reference.

FIELD OF THE INVENTION

The present invention relates to a solid-state battery and a method for manufacturing the same.

BACKGROUND OF THE INVENTION

In the related art, a solid-state battery that does not use an electrolytic solution is known (for example, Patent Document 1). Since the solid-state battery does not use the electrolytic solution, there are advantages that the solid-state battery can be used in a high-temperature atmosphere and has excellent safety.

In certain configurations, for example, a voltage higher than a voltage determined by a potential difference between a positive electrode and a negative electrode may be required depending on a type of an electronic device. In this case, when the solid-state battery with a fixed output voltage is used, it is necessary to prepare a plurality of solid-state batteries and connect these solid-state batteries in series. When the plurality of solid-state batteries are used, there is a problem that a large space is required as a mounting space for the solid-state batteries in addition to complexity of the mounting of the solid-state batteries.

Because the solid-state battery according to the present embodiment is connected in series and includes first and second elements each having the external electrode connected to the positive electrode and the external electrode connected to the negative electrode, the solid-state battery has the output voltage that is twice or more the voltage obtained from a single element.

Patent Document 1: Japanese Patent Application Laid-Open No. 2015-220105

SUMMARY OF THE INVENTION

A main object of the present invention is to provide a solid-state battery having a high voltage.

A solid-state battery according to one aspect of the present invention includes a battery body, a first external electrode, a second external electrode, a third external electrode, and a fourth external electrode. The battery body includes a plurality of adjacent elements. A first element includes a first positive electrode, a first negative electrode, and a first solid electrolyte layer. The first positive electrode is drawn out to a first surface of the battery body. The first negative electrode faces the first positive electrode and is drawn out to a second surface of the battery body. The first solid electrolyte is between the first positive electrode and the first negative electrode. The second element includes a second positive electrode, a second negative electrode, and a second solid electrolyte layer. The second positive electrode is drawn out to the second surface. The second negative electrode faces the second positive electrode and is drawn out to first surface. The second solid electrolyte layer is between the second positive electrode and the second negative electrode. The first external electrode is provided on the first surface and is electrically connected to the first positive electrode. The second external electrode is provided on the second surface and is electrically connected to the first negative electrode. The third external electrode is provided on the second surface and is electrically connected to the second positive electrode. The fourth external electrode is provided on the first surface and is electrically connected to the second negative electrode. The first external electrode and the fourth external electrode or the second external electrode and the third external electrode are integral so as to connect the first element and the second element in series.

DETAILED DESCRIPTION OF THE INVENTION

Figure 1:
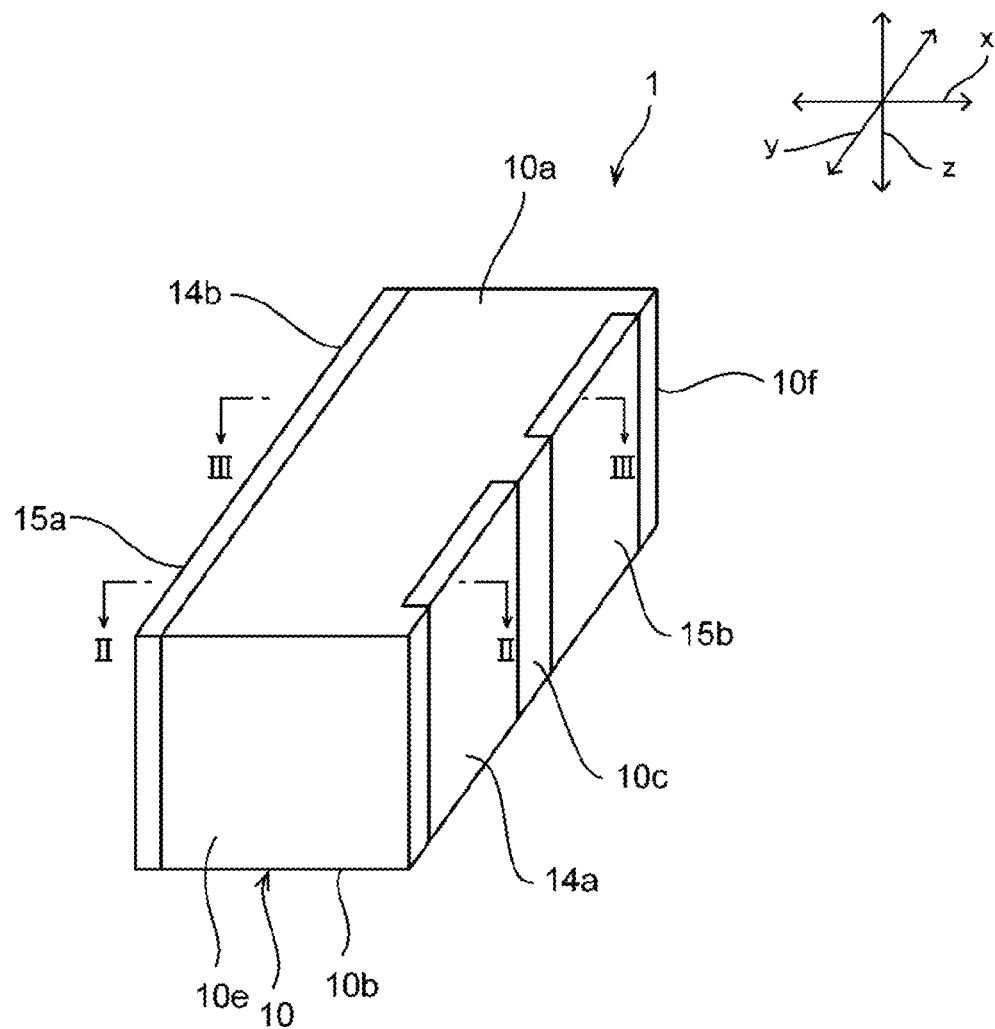
FIG. 1 is a schematic perspective view of a solid-state battery according to a first embodiment.

Hereinafter, an example of a preferred embodiment of the present invention will be described. However, the following embodiment is merely an example. The present invention is not at all limited to the following embodiment.

In the drawings to be referred to in the embodiment, members having substantially the same function are referred to by the same reference symbols. The drawings to be referred to in the embodiment are schematically described. A ratio of dimensions of objects drawn in the drawings may be different from a ratio of dimensions of actual objects. The ratio of the dimensions of the objects may differ between the drawings. A specific ratio of dimensions of the objects needs to be determined in consideration of the following description.

First Embodiment

Figure 2:
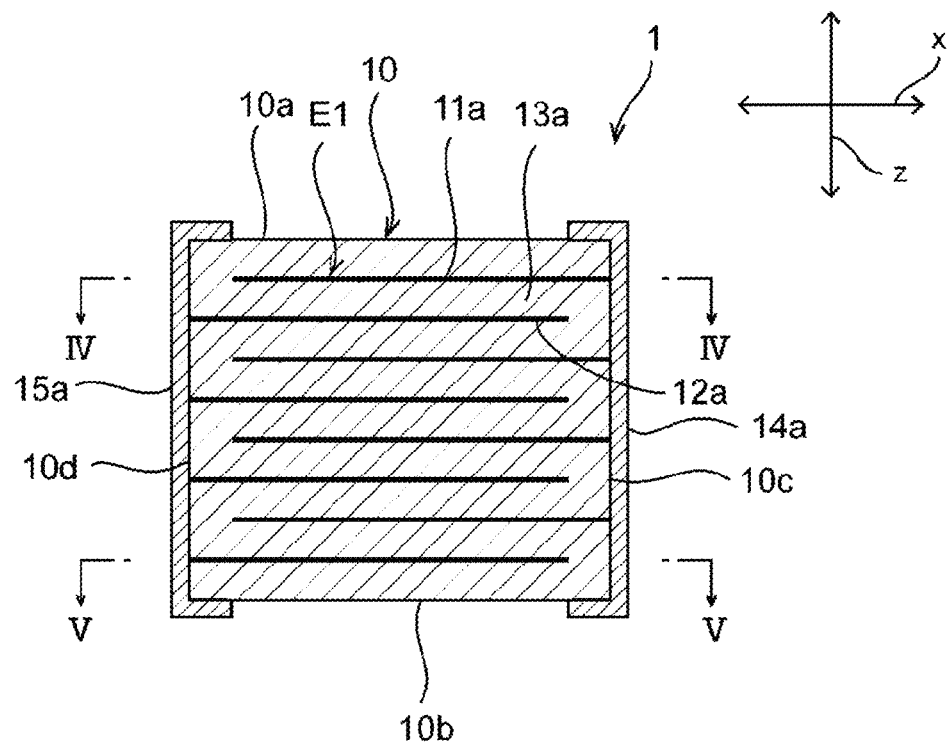
FIG. 2 is a schematic sectional view taken along line II-II of FIG. 1.
Figure 3:
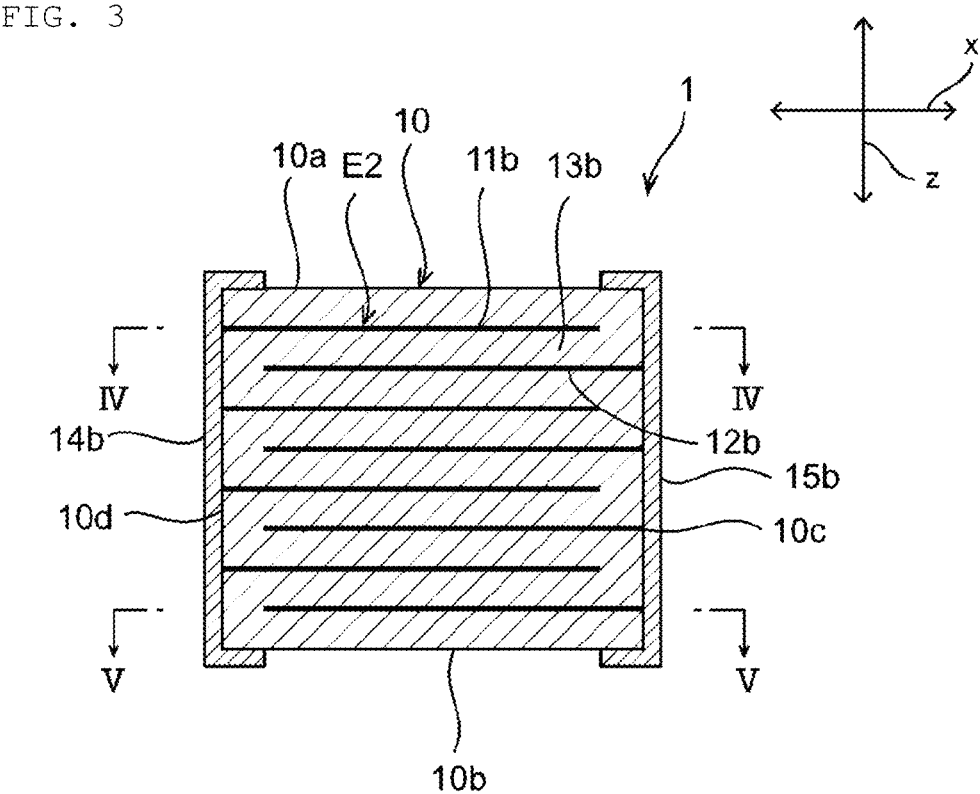
FIG. 3 is a schematic sectional view taken along line III-III of FIG. 1.
Figure 4:
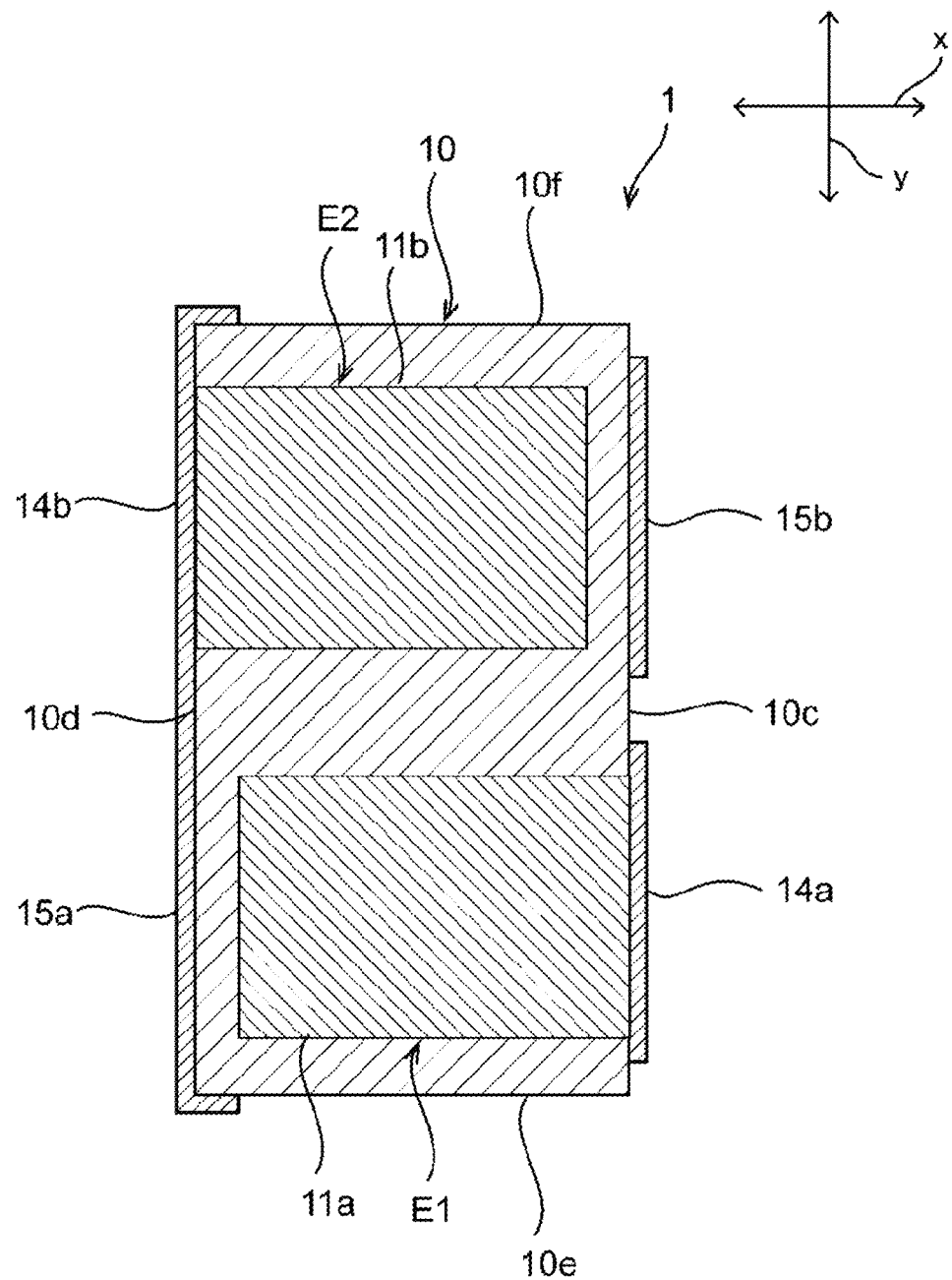
FIG. 4 is a schematic sectional view taken along line IV-IV of FIGS. 2 and 3.
Figure 5:
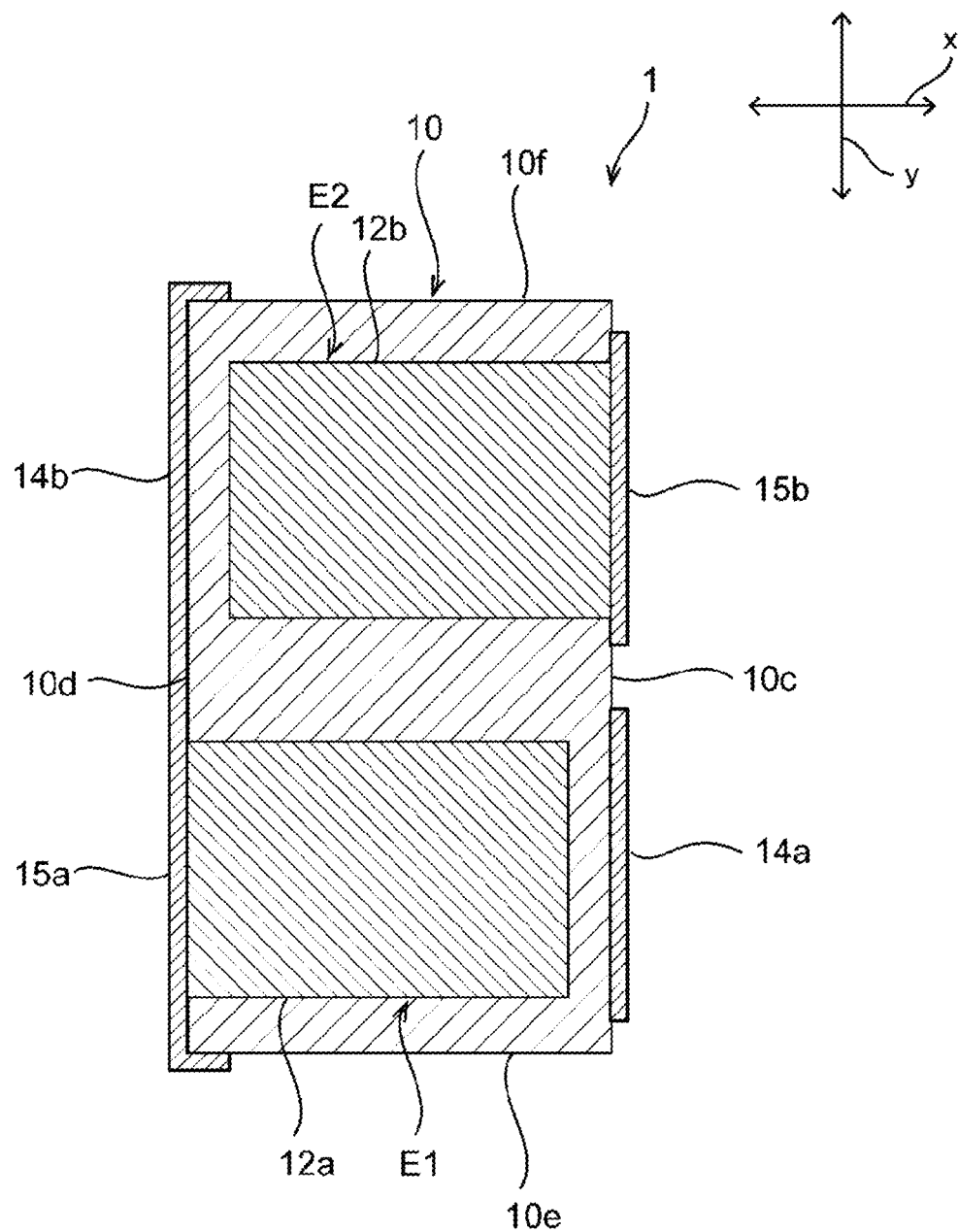
FIG. 5 is a schematic sectional view taken along line V-V of FIGS. 2 and 3.
Figure 6:
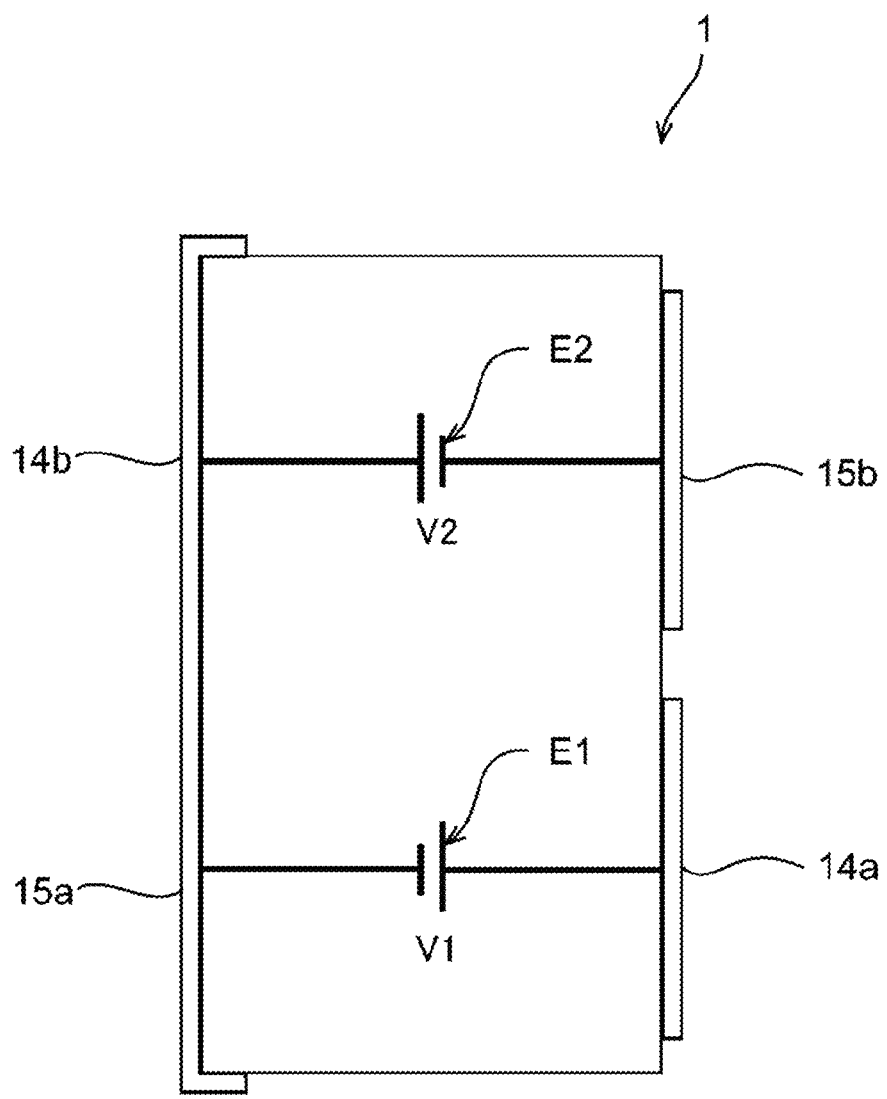
FIG. 6 is a schematic circuit diagram of the solid-state battery according to the first embodiment.

FIG. 1 is a schematic perspective view of a solid-state battery according to a first embodiment. FIG. 2 is a schematic sectional view taken along line II-II of FIG. 1. FIG. 3 is a schematic sectional view taken along line III-III of FIG. 1. FIG. 4 is a schematic sectional view taken along line IV-IV of FIGS. 2 and 3. FIG. 5 is a schematic sectional view taken along line V-V of FIGS. 2 and 3. FIG. 6 is a schematic circuit diagram of the solid-state battery according to the first embodiment.

A solid-state battery 1 illustrated in FIG. 1 is a battery in which all constituent elements are solid by using a solid electrolyte as an electrolyte and not using a liquid electrolytic solution. In the present embodiment, specifically, an example in which the solid-state battery 1 is a solid-state lithium-ion secondary battery will be described. However, the solid-state battery according to the present invention may be a solid-state battery other than the lithium-ion secondary battery.

As illustrated in FIGS. 1 to 5, the solid-state battery 1 includes a battery body 10. A shape of the battery body 10 is not particularly limited. In the present embodiment, the battery body 10 has specifically a rectangular parallelepiped shape. The "rectangular parallelepiped shape" includes a rectangular parallelepiped shape of which corners and ridges are chamfered or rounded.

The battery body 10 includes first and second main surfaces 10a and 10b, and first to fourth side surfaces 10c to 10f. The first and second main surfaces 10a and 10b extend along an x-axis direction and a y-axis direction, respectively. The first and second side surfaces 10c and 10d extend along the y-axis direction and a z-axis direction, respectively. The third and fourth side surfaces 10e and 10f extend along the x-axis direction and the z-axis direction, respectively.

The battery body 10 includes a plurality of elements. Here, the "element" includes a positive electrode, a negative electrode, and a solid electrolyte layer provided between the positive electrode and the negative electrode, and denotes a chargeable and dischargeable electric storage element.

In the present embodiment, specifically, the battery body 10 includes a first element E1 and a second element E2 as illustrated mainly in FIG. 6. The second element E2 is adjacent to the first element E1 in the y-axis direction.

As illustrated in FIG. 2, the first element E1 has a plurality of first positive electrodes 11a and a plurality of first negative electrodes 12a. The first positive electrodes 11a and the first negative electrodes 12a extend along the x-axis direction and the y-axis direction, respectively. Thus, the first positive electrodes 11a and the first negative electrodes 12a are parallel to the first and second main surfaces 10a and 10b, respectively. The plurality of first positive electrodes 11a and the plurality of first negative electrodes 12a are alternately provided at intervals in the z-axis direction. The first positive electrode 11a and the first negative electrode 12a which are adjacent to each other in the z-axis direction (laminating direction) face each other with a first solid electrolyte layer 13a interposed therebetween.

A size of the positive electrode 11a and a size of the negative electrode 11b may be equal or different.

Each of the plurality of first positive electrodes 11a are drawn out to the first side surface 10c, but are not drawn out to the second side surface 10d. The plurality of first positive electrodes 11a are electrically connected to a first external electrode (first positive electrode terminal electrode) 14a provided on the first side surface 10c.

Each of the plurality of first negative electrodes 12a are drawn out to the second side surface 10d, but are not drawn out to the first side surface 10c. The plurality of first negative electrodes 12a are electrically connected to a second external electrode (first negative electrode terminal electrode) 15a provided on the second side surface 10d.

As illustrated in FIG. 3, the second element E2 includes a plurality of second positive electrodes lib and a plurality of second negative electrodes 12b. The second positive electrodes lib and the second negative electrodes 12b extend along the x-axis direction and the y-axis direction, respectively. Thus, the second positive electrodes lib and the second negative electrodes 12b are parallel to the first and second main surfaces 10a and 10b, respectively. The plurality of second positive electrodes 11b and the plurality of second negative electrodes 12b are alternately provided at intervals in the z-axis direction. The second positive electrode 11b and the second negative electrode 12b which are adjacent to each other in the z-axis direction (laminating direction) face each other with a second solid electrolyte layer 13b interposed therebetween.

Each of the plurality of second positive electrodes 11b are drawn out to the second side surface 10d, but are not drawn out to the first side surface 10c. The plurality of second positive electrodes 11b are electrically connected to a third external electrode (second positive electrode terminal electrode) 14b provided on the second side surface 10d.

Each of the plurality of second negative electrodes 12b are drawn out to the first side surface 10c, but are not drawn out to the second side surface 10d. The plurality of second negative electrodes 12b are electrically connected to a fourth external electrode (second negative electrode terminal electrode) 15b provided on the first side surface 10c.

As illustrated in FIGS. 1, 4, 5, and 6, in the solid-state battery 1, the second external electrode (first negative electrode terminal electrode) 15a and the third external electrode (second positive electrode terminal electrode) 14b are integrally provided. Thus, the first element E1 and the second element E2 are connected in series. Thus, in a case where a voltage of the first element E1 is V1 and a voltage of the second element E2 is V2, the solid-state battery 1 has three kinds of output voltages V1, V2, and V1+V2. In other words, a power of three kinds of voltages of V1, V2, and V1+V2 can be output from the solid-state battery 1. Specifically, the output voltage V1 can be obtained by using the first external electrode 14a and the second external electrode 15a. The output voltage V2 can be obtained by using the third external electrode 14b and the fourth external electrode 15b. The output voltage V1+V2 can be obtained by using the first external electrode 14a and the fourth external electrode 15b. Thus, the solid-state battery 1 can be used as a power source of the voltage V1, the voltage V2, and the voltage V1+V2. It is possible to drive an electronic device that requires a power of at least two kinds of the voltage V1, the voltage V2, and the voltage V1+V2 by one solid-state battery 1. Accordingly, a mounting area can be smaller in a case where the solid-state battery 1 is used than in a case where a plurality of solid-state batteries having different output voltages is used.

It has been described in the present embodiment that the first element E1 and the second elements E2 are connected in series by integrally connecting the second external electrode (first negative electrode terminal electrode) 15a and the third external electrode (second positive electrode terminal electrode) 14b. However, in the present invention, a form of the external electrode is not particularly limited as long as the first element E1 and the second element E2 are connected in series. For example, the first external electrode (first positive electrode terminal electrode) 14a and the fourth external electrode (second negative electrode terminal electrode) 15b may be integrally provided, and the second and third external electrodes 15a and 14b may be provided separately.

An aspect in which the solid-state battery 1 is mounted on a mounting substrate is not particularly limited. For example, the solid-state battery 1 may be mounted such that the first side surface 10c faces the mounting substrate side. The solid-state battery 1 may be mounted such that the first or second main surface 10a or 10b faces the mounting substrate side.

It has been described in the present embodiment that the solid-state battery 1 includes two elements of the first element E1 and the second element E2. However, the present invention is not limited to this configuration.

For example, the solid-state battery according to the present invention may include three or more elements connected in series by external electrodes. As the number of elements included in the solid-state battery becomes larger, the number of kinds of voltages that can be output becomes larger.

Figure 7:
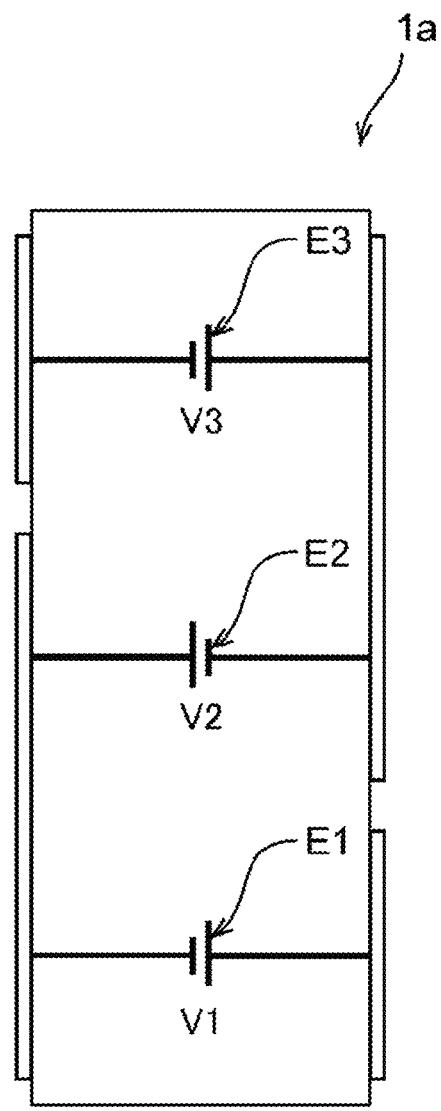
FIG. 7 is a schematic circuit diagram of a solid-state battery according to a second embodiment.

Specifically, for example, in a solid-state battery 1a according to a second embodiment illustrated in FIG. 7, a first element E1, a second element E2, and a third element E3 are connected in series by external electrodes in this order. Thus, from the solid-state battery 1a, a power of six kinds of voltages V1, V2, V3, V1+V2, V2+V3, and V1+V2+V3 can be output.

(Constituent Material)

Materials of a positive electrode, a negative electrode, an external electrode, and a solid electrolyte layer constituting each of the elements E1 and E2 are not particularly limited.

For example, the positive electrode may be composed of a positive electrode active material layer, or may be composed of a positive electrode current collector layer and a positive electrode active material layer provided on the positive electrode current collector layer.

The positive electrode current collector layer contains a conductive material such as a carbon material or a metal material. Specific examples of the carbon material preferably used include, for example, graphite and carbon nanotubes. Specific examples of the metal material preferably used include, for example, Cu, Mg, Ti, Fe, Co, Ni, Zn, Al, Ge, In, Au, Pt, Pd, and alloys including these metal materials. The positive electrode current collector layer may further contain a binder and a solid electrolyte in addition to the conductive material.

The positive electrode active material layer contains a positive electrode active material. Examples of the positive electrode active material preferably used include lithium transition metal composite oxides and lithium transition metal phosphate compounds. Specific examples of the lithium transition metal composite oxide include $LiCoO_2$, $LiNiO_2$, $LiVO_2$, $LiCrO_2$, and $LiMn_2O_4$. Specific examples of the lithium transition metal phosphate compound include $LiFePO_4$ and $LiCoPO_4$. The positive electrode active material layer may further contain a binder, a conductive material, and a solid electrolyte in addition to the positive electrode active material.

For example, the negative electrode may be composed of a negative electrode active material layer, or may be composed of a negative electrode current collector layer and a negative electrode active material layer formed on the negative electrode current collector layer.

The negative electrode current collector layer contains a conductive material such as a carbon material or a metal material. Examples of the carbon material and the metal material preferably used for the negative electrode current collector layer include the same carbon materials and metal materials preferably used for the positive electrode current collector layer described above. The negative electrode current collector layer may further contain a binder and a solid electrolyte in addition to the conductive material.

The negative electrode active material layer contains a negative electrode active material. Examples of the negative electrode active material preferably used include a carbon material, a metal material, a semimetal material, a lithium transition metal composite oxide, and lithium metal. Specific examples of the carbon material preferably used as the negative electrode active material include graphite, graphitizing carbon, non-graphitizing carbon, graphite, mesocarbon microbead (MCMB), and highly oriented graphite (HOPG). Specific examples of the metal material and the semimetal material preferably used as the negative electrode active material include Si, Sn, $SiB_4$, $TiSi_2$, SiC, $Si_3N_4$, $SiO_v$ (0<v≤2), LiSiO, $SnO_w$ (0<w≤2), $SnSiO_3$, LiSnO, and $Mg_2Sn$. Specific examples of the lithium transition metal composite oxide preferably used as the negative electrode active material include $Li_4Ti_5O_{12}$. The negative electrode active material layer may further contain a binder, a conductive material, and a solid electrolyte in addition to the negative electrode active material.

The solid electrolyte layer contains a solid electrolyte. Specific examples of the solid electrolyte preferably used include sulfides such as $Li_2S$—$P_2S_5$, $Li_2S$—$SiS_2$—$Li_3PO_4$, $Li_7P_3S_{11}$, $Li_{3.25}Ge_{0.25}P_{0.75}S$, and $Li_{10}GeP_2S_{12}$, oxides such as $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, and $La_{2/3-x}Li_{3x}TiO_3$, and polymer materials such as polyethylene oxide (PEO). The solid electrolyte layer may further contain a binder in addition to the solid electrolyte.

The external electrode contains a conductive material such as a metal material. Examples of the metal material preferably used for the external electrode include Ag, Au, Pt, Al, Cu, Sn, Ni, and alloys containing these metals. The external electrode may further contain a binder and a solid electrolyte in addition to the conductive material.

(Method for Manufacturing Solid-State Battery 1)

Next, an example of a method for manufacturing the solid-state battery 1 according to the first embodiment will be described.

Figure 8:
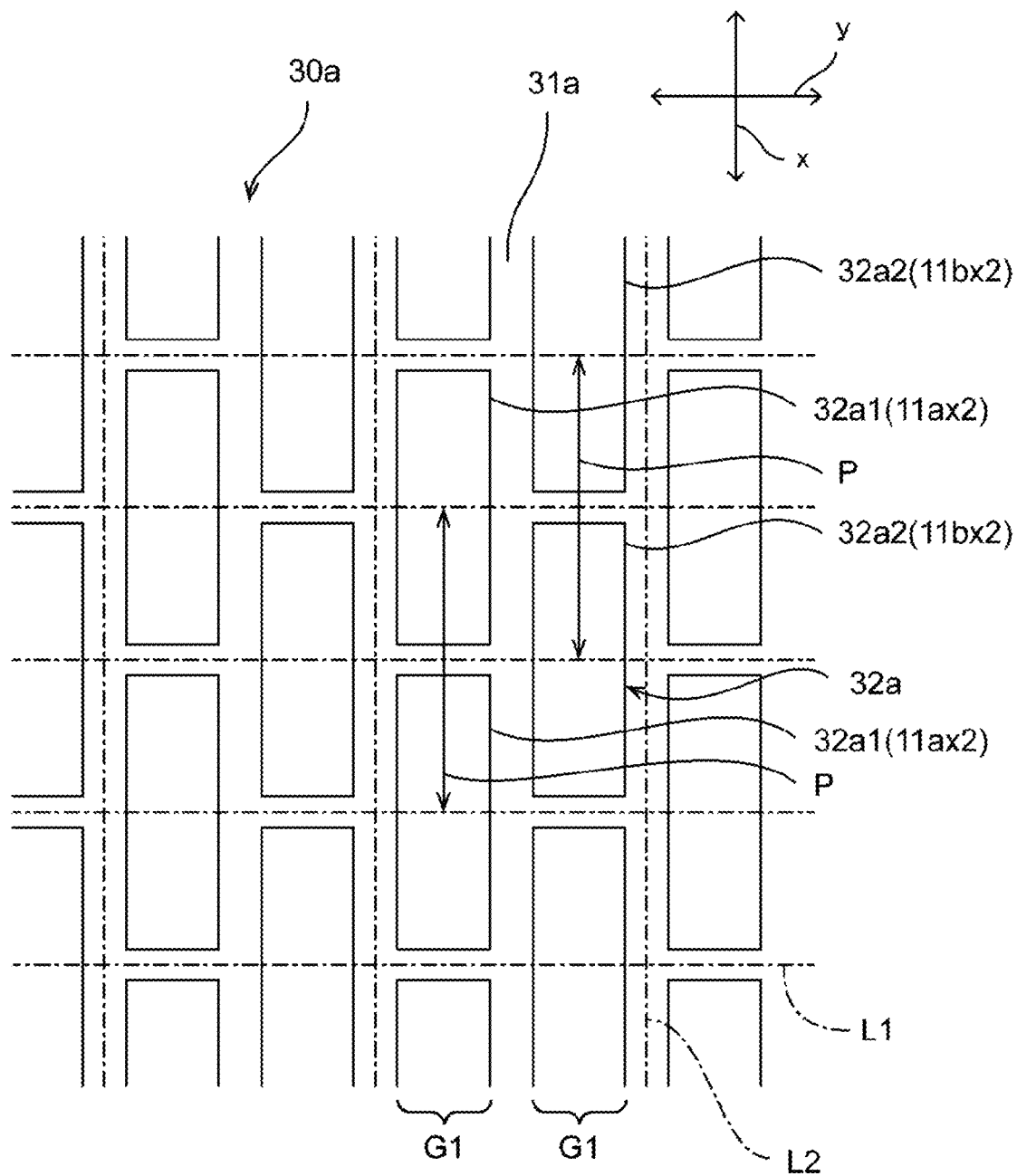
FIG. 8 is a schematic plan view of a part of a positive electrode green sheet.
Figure 9:
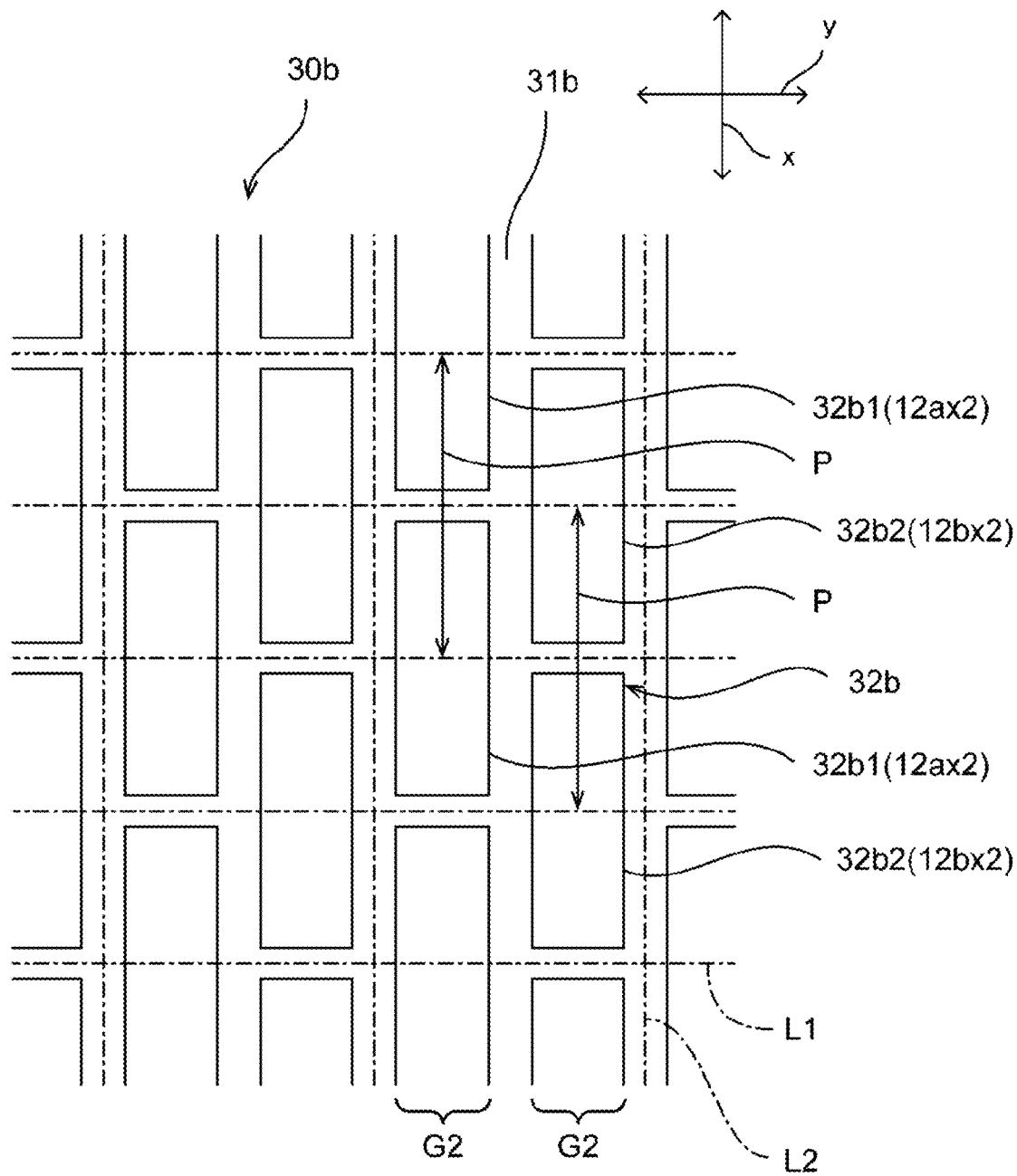
FIG. 9 is a schematic plan view of a part of a negative electrode green sheet.

First, green sheets 31a and 31b for forming the solid electrolyte layers 13a and 13b are prepared (see FIGS. 8 and 9). The green sheets 31a and 31b can be prepared, for example, by the following procedure. First, a slurry is prepared by mixing a solid electrolyte with an organic binder, a solvent, and an additive. Subsequently, the green sheets 31a and 31b can be manufactured by applying the slurry onto a resin sheet, forming the slurry into a sheet shape, and drying the slurry.

Subsequently, as illustrated in FIG. 8, a positive electrode green sheet 30a is prepared by forming a plurality of positive electrode conductive paste layers 32a for forming the positive electrodes 11a and 11b in a matrix on the green sheet 31a. In the present embodiment, an example in which two positive electrode conductive paste layers 32a1 for forming the positive electrode 11a are continuously formed in the x-axis direction, and two conductive paste layers 32a2 for forming the positive electrode 11b are continuously formed in the x-axis direction will be described below. Specifically, in the present embodiment, two positive electrode conductive paste layers 32a1 are formed integrally and two positive electrode conductive paste layers 32a2 formed integrally are formed in a zigzag manner so as to be shifted by a half period in the y-axis direction.

More specifically, such forming is as follows: Two first positive electrodes 11a are formed by the positive electrode conductive paste layers 32a1 (first positive electrode 11a×2), and two second positive electrodes 11b are formed by the positive electrode conductive paste layers 32a2 (second positive electrode 11b×2). The positive electrode conductive paste layers 32a are arranged at a predetermined pitch P along the x direction. A first group G1 indicating a group of the positive electrode conductive paste layers 32a arranged in the x direction is arranged so as to be shifted by a half of the pitch P along the x direction with respect to the adjacent first group G1.

Similarly, as illustrated in FIG. 9, a negative electrode green sheet 30b is prepared by forming a plurality of negative electrode conductive paste layers 32b for forming the negative electrodes 12a and 12b in a matrix on the green sheet 31b. In the present embodiment, an example in which two negative electrode conductive paste layers 32b1 for forming the negative electrode 12a are continuously formed in the x-axis direction, and negative electrode conductive paste layers 32b2 for forming the negative electrode 12b are continuously formed in the x-axis direction will be described. Specifically, in the present embodiment, the two negative electrode conductive paste layers 32b1 formed integrally and the two negative electrode conductive paste layers 32b2 formed integrally are formed in a zigzag manner so as to be shifted by a half period in the y-axis direction.

More specifically, such forming is as follows: Two first negative electrodes 12a are formed by the negative electrode conductive paste layers 32b1 (first negative electrode 12a× 2), and two second negative electrodes 12b are formed by the negative electrode conductive paste layers 32b2 (second negative electrode 12b×2). The negative electrode conductive paste layers 32b are arranged at a predetermined pitch P along the x direction (this pitch P is the same as the pitch P illustrated in FIG. 8). A second group G2 indicating a group of the negative electrode conductive paste layers 32b arranged in the x direction is arranged so as to be shifted by a half of the pitch P along the x direction with respect to the adjacent second group G2.

If necessary, an insulating layer may be formed at portions of the green sheets 31a and 31b at which the conductive paste layers are not formed.

Subsequently, a laminate is formed by appropriately laminating the green sheet on which the conductive paste layer is not formed, the positive electrode green sheet 30a, and the negative electrode green sheet 30b. At this time, the green sheets 31a and 31b are laminated such that a period of the matrix pattern of the plurality of positive electrode conductive paste layers 32a1 and 32a2 and a period of the matrix pattern of the plurality of negative electrode conductive paste layers 32b1 and 21b2 are shifted by ½ of the pitch P in the x-axis direction. Specifically, the green sheets 31a and 31b are laminated such that the periods of the two positive electrode conductive paste layers 32a1 integrally formed and the two negative electrode conductive paste layers 32b1 integrally formed are shifted by a half period (½ of the pitch P) in the x-axis direction and the periods of the two positive electrode conductive paste layers 32a2 formed integrally and the two negative electrode conductive paste layers 32b2 formed integrally are shifted by a half period (½ of the pitch P) in the x-axis direction.

Subsequently, raw chips are prepared by dividing the laminate into a plurality of chips. Specifically, in the present embodiment, the laminate is divided into the plurality of chips along a cut line L1 extending in the y-axis direction and a cut line L2 extending in the x-axis direction.

Thereafter, the battery body 10 is obtained by firing the raw chip.

Subsequently, the external electrodes 14a, 14b, 15a, and 15b are formed on the battery body 10. The external electrodes 14a, 14b, 15a, and 15b can be formed, for example, by curing a thermosetting resin containing a conductive resin. A plating layer may be formed on the external electrodes 14a, 14b, 15a, and 15b if necessary. A protective layer may be formed on the battery body 10. It is possible to suppress the entrance of water into the battery body 10 by forming the protective layer.

SUMMARY OF EMBODIMENT

Referring to FIGS. 2, 3, and 6, the first positive electrode may include a plurality of first positive electrodes drawn out to the first surface, the first negative electrode may include a plurality of first negative electrodes drawn out to the second surface, the second positive electrode may include a plurality of second positive electrodes drawn out to the second surface, the second negative electrode may include a plurality of second negative electrodes drawn out to the first surface. The battery body includes a laminated structure (laminate) in which the first positive electrode and the first negative electrode are arranged so as to be alternately laminated at an interval and the second positive electrode and the second negative electrode are arranged so as to be alternately laminated at an interval.

Referring to FIGS. 2 to 5, in the laminated structure, the first positive electrode and the second positive electrode are located on the same layer, and the first negative electrode and the second negative electrode are located on the same layer.

Referring to FIGS. 2, 3, and 6, the first surface and the second surface intersect (orthogonal) with the laminating direction of the laminated structure, and face each other in a direction intersecting (orthogonal) with a direction in which the first element and the second element are arranged.

Referring to FIG. 1, a case where the second external electrode and the third external electrode are integrally provided indicates that the battery body includes a first conductive member including a portion functioning as the second external electrode and a portion functioning as the third external electrode. In the case of FIG. 1, a member composed of the second external electrode 15a and the third external electrode 14b serves as the first conductive member.

The first conductive member is fixed to the second surface. The first conductive member has a flat plate shape. When the battery body includes the first conductive member, the first conductive member and the fourth conductive member are separated on the first surface.

Where the first external electrode and the fourth external electrode are integrally provided indicates that the battery body includes a second conductive member having a portion functioning as the first external electrode and a portion functioning as the fourth external electrode.

The second conductive member has a flat plate shape. The second conductive member is fixed to the first surface. When the battery body includes the second conductive member, the second conductive member and the third conductive member are separated on the second surface.

The invention claimed is:

1. A solid-state battery comprising:
  a battery body that includes a plurality of adjacent elements, a first element of the plurality of adjacent elements including a first positive electrode drawn out to a first surface of the battery body and not drawn out to a second surface of the battery body, a first negative electrode facing the first positive electrode and drawn out to the second surface of the battery body and not drawn out to the first surface of the battery body, and a first solid electrolyte layer between the first positive electrode and the second negative electrode, a second element of the plurality of adjacent elements including a second positive electrode drawn out to the second surface of the battery body and not drawn out to the first surface of the battery body, a second negative electrode facing the second positive electrode and drawn out to the first surface of the battery body and not drawn out to the second surface of the battery body, and a second solid electrolyte layer between the second positive electrode and the second negative electrode, wherein the first surface and the second surface of the battery body face each other and are orthogonal to a laminating direction of the first element and second element of the plurality of adjacent elements;

a first external electrode on the first surface and electrically connected to the first positive electrode;

a second external electrode on the second surface and electrically connected to the first negative electrode;

a third external electrode on the second surface and electrically connected to the second positive electrode; and a fourth external electrode on the first surface and electrically connected to the second negative electrode, wherein the first external electrode and the fourth external electrode or the second external electrode and the third external electrode are integral so as to connect the first element and the second element in series.

2. The solid-state battery according to claim 1, wherein the plurality of adjacent elements is three or more elements, and adjacent elements of the three or more elements are connected in series.

3. The solid-state battery according to claim 1, wherein the first element has a voltage V1 and the second element has a voltage V2, and the solid-state battery is configured to output the voltage V1 by using the first external electrode and the second external electrode, output the voltage V2 by using the third external electrode and the fourth external electrode, and output the voltage V1+V2 by using the first external electrode and the fourth external electrode.

4. The solid-state battery according to claim 1, wherein the first surface and the second surface of the battery body face each other.

5. A method for manufacturing a solid-state battery, the method comprising:

preparing a plurality of first green sheets and a plurality of second green sheets; and preparing a plurality of positive electrode green sheets by forming a plurality of positive electrode conductive paste layers in a first matrix shape on a plurality of first green sheets by arranging a plurality of first groups of the positive electrode conductive paste layers at predetermined pitches along a predetermined direction so as to be shifted by a half of the predetermined pitch along the predetermined direction with respect to an adjacent first group of the plurality of first groups;

preparing a plurality of negative electrode green sheets by forming a plurality of negative electrode conductive paste layers in a second matrix shape on a plurality of second green sheets by arranging a plurality of second groups of the negative electrode conductive paste layers at the predetermined pitch along the predetermined direction so as to be shifted by a half of the predetermined pitch along the predetermined direction with respect to an adjacent second group of the plurality of second groups;

preparing a laminate by alternatively laminating the positive electrode green sheets and the negative electrode green sheets such that the first group and the second group face each other and are shifted by the half of the predetermined pitch in the predetermined direction;

cutting a plurality of raw chips from the laminate; and firing a raw chip of the plurality of raw chips cut from the laminate so as to form a battery body having a plurality of adjacent elements, a first element of the plurality of adjacent elements including a first positive electrode drawn out to a first surface of the battery body and not drawn out to a second surface of the battery body, a first negative electrode facing the first positive electrode and drawn out to the second surface of the battery body and not drawn out to the first surface of the battery body, and a first solid electrolyte layer between the first positive electrode and the second negative electrode, a second element of the plurality of adjacent elements including a second positive electrode drawn out to the second surface of the battery body and not drawn out to the first surface of the battery body, a second negative electrode facing the second positive electrode and drawn out to the first surface of the battery body and not drawn out to the second surface of the battery body, and a second solid electrolyte layer between the second positive electrode and the second negative electrode, wherein the first surface and the second surface of the battery body face each other and are orthogonal to a laminating direction of the first element and second element of the plurality of adjacent elements;

forming a first external electrode on the first surface so as to be electrically connected to the first positive electrode;

forming a second external electrode on the second surface so as to be electrically connected to the first negative electrode;

forming a third external electrode on the second surface so as to be electrically connected to the second positive electrode; and forming a fourth external electrode on the first surface so as to be electrically connected to the second negative electrode, wherein the first external electrode and the fourth external electrode or the second external electrode and the third external electrode are integrally formed so as to connect the first element and the second element in series.

6. The method for manufacturing the solid-state battery according to claim 5, wherein the battery body is formed to have three or more adjacent elements, and respective adjacent elements of the three or more adjacent elements are connected in series.

7. The method for manufacturing the solid-state battery according to claim 5, wherein the second external electrode and the third external electrode are integrally formed, the first element has a voltage V1 and the second element has a voltage V2, and the solid-state battery is configured to output the voltage V1 by using the first external electrode and the second external electrode, output the voltage V2 by using the third external electrode and the fourth external electrode, and output the voltage V1+V2 by using the first external electrode and the fourth external electrode.

* * * * *